United States Patent
Wallner et al.

(10) Patent No.: US 6,308,982 B1
(45) Date of Patent: Oct. 30, 2001

(54) INFLATABLE CURTAIN WITH TENSIONING DEVICE

(75) Inventors: John P. Wallner, Rochester; Paul F. Altamore, Rochester Hills; Gwendoyln C. Hatten, Shelby Township, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/327,588

(22) Filed: Jun. 8, 1999

(51) Int. Cl.[7] .................................................. B60R 21/22
(52) U.S. Cl. ........................................ 280/730.2; 280/749
(58) Field of Search ............................. 280/730.2, 728.2, 280/749, 753, 751

(56) References Cited

U.S. PATENT DOCUMENTS

| 3,687,485 | 8/1972 | Campbell . |
| 5,265,903 | 11/1993 | Kuretake et al. . |
| 5,322,322 | 6/1994 | Bark et al. . |
| 5,462,308 | 10/1995 | Seki et al. . |
| 5,588,672 | 12/1996 | Karlow et al. . |
| 5,605,346 | 2/1997 | Cheung et al. . |
| 5,660,414 | 8/1997 | Karlow et al. . |
| 5,707,075 | 1/1998 | Kraft et al. . |
| 5,788,270 | 8/1998 | HAland et al. . |
| 5,865,462 | * 2/1999 | Robins et al. ................ 280/730.2 |
| 5,899,491 | * 5/1999 | Tschaeschke .................. 280/730.2 |
| 5,924,723 | * 7/1999 | Brantman et al. ................ 280/730.2 |
| 6,010,149 | * 1/2000 | Riedel et al. .................... 280/730.2 |
| 6,022,044 | * 2/2000 | Cherry ............................ 280/730.2 |
| 6,073,961 | * 6/2000 | Bailey et al. .................... 280/730.2 |
| 6,155,597 | * 12/2000 | Bowers et al. .................. 280/730.2 |
| 6,173,989 | * 1/2001 | Stutz ............................... 280/730.2 |
| 6,176,513 | * 1/2001 | Neidert ............................ 280/729 |
| 6,189,918 | * 2/2001 | Stavermann .................... 280/730.2 |

FOREIGN PATENT DOCUMENTS

| 296 10 920 U | 6/1996 | (DE) . |
| 296 15 485 U | 9/1996 | (DE) . |
| 2297950 | 8/1996 | (GB) . |
| 6227340 | 8/1994 | (JP) . |

\* cited by examiner

*Primary Examiner*—Brian L. Johnson
*Assistant Examiner*—Tony Winner
(74) *Attorney, Agent, or Firm*—Tarolli, Sundheim, Covell, Tummino & Szabo L.L.P.

(57) ABSTRACT

An apparatus (10) for helping to protect an occupant of a vehicle (12) which has a side structure (16) comprises a vehicle occupant protection device (14). The vehicle occupant protection device (14) is inflatable in a first direction into a position between the side structure (16) of the vehicle (12) and a vehicle occupant. When inflated, the vehicle occupant protection device (14) extends fore and aft in the vehicle (12) along the side structure (16) of the vehicle (12). An inflator (24) provides inflation fluid for inflating the vehicle occupant protection device. A mechanism (50) causes the vehicle occupant protection device (14) when inflated to be tensioned in the first direction along the fore and aft extent of the vehicle occupant protection device.

17 Claims, 2 Drawing Sheets

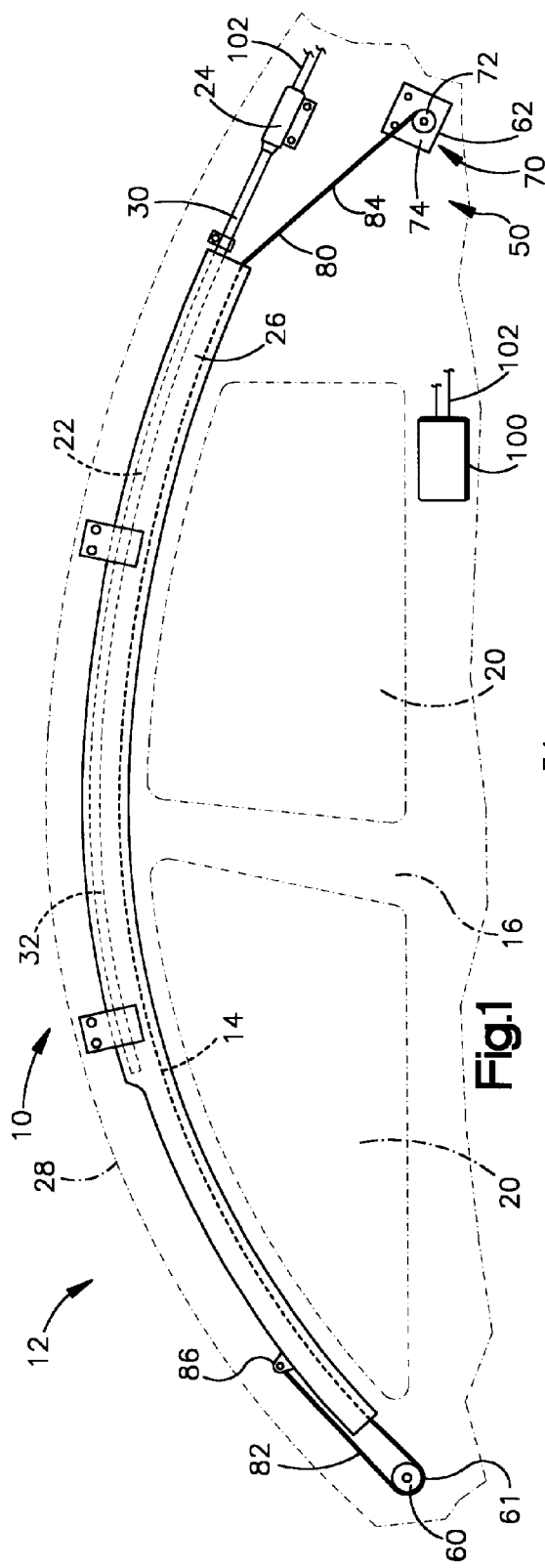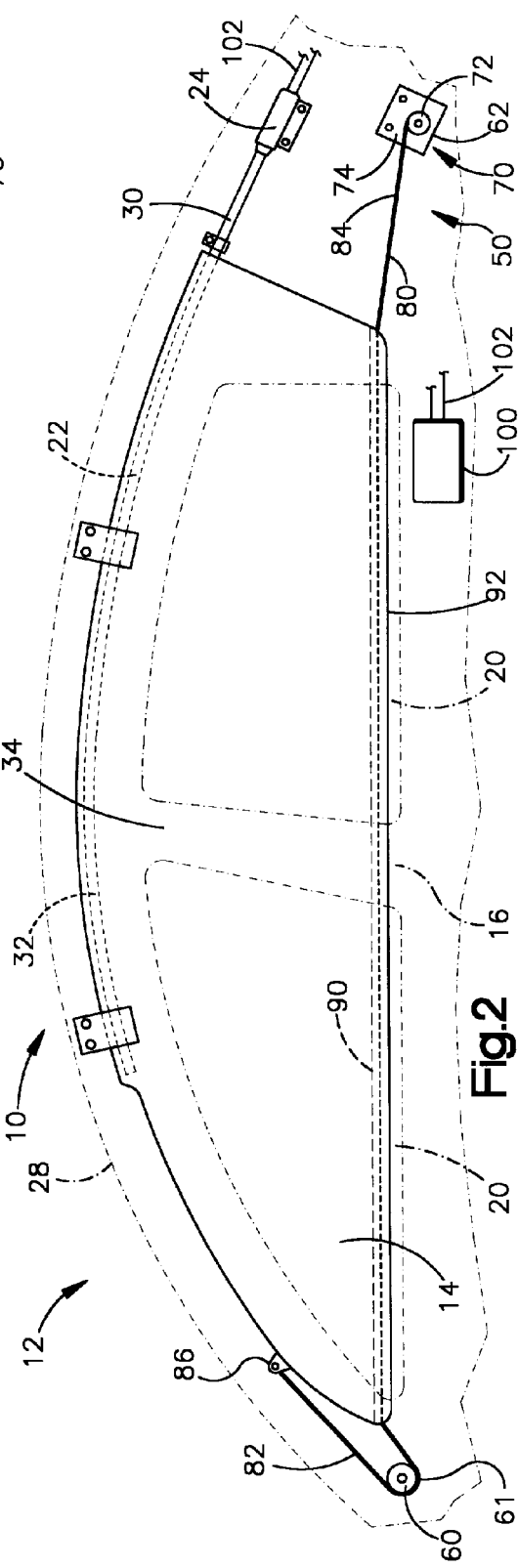

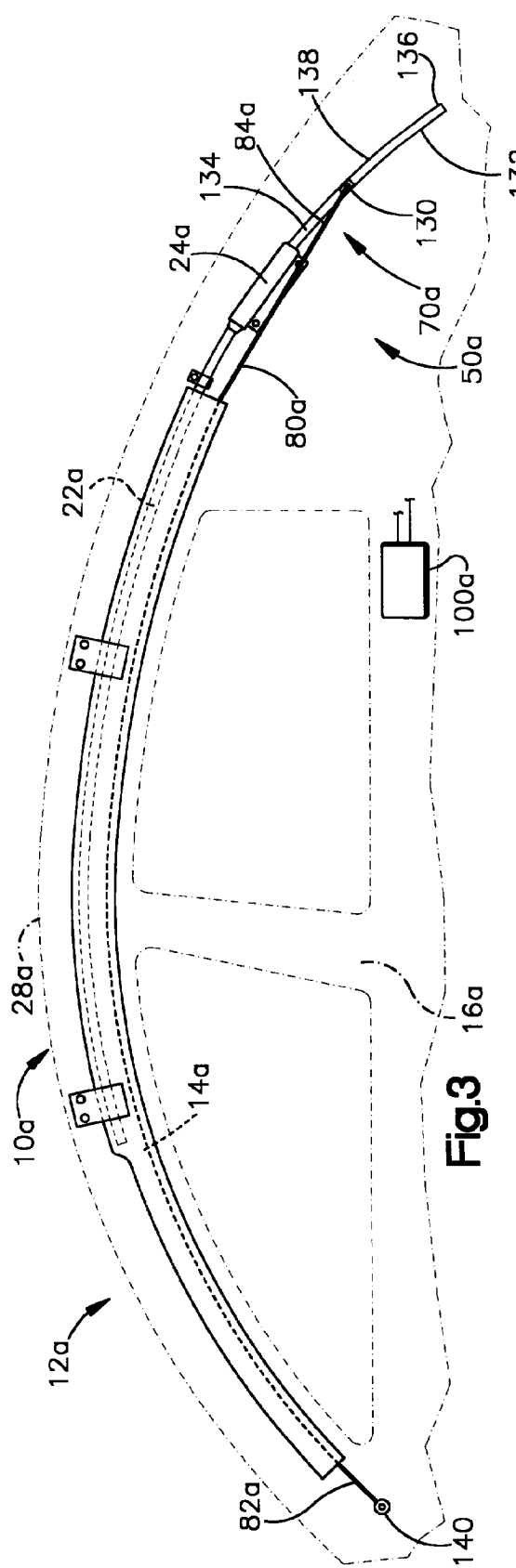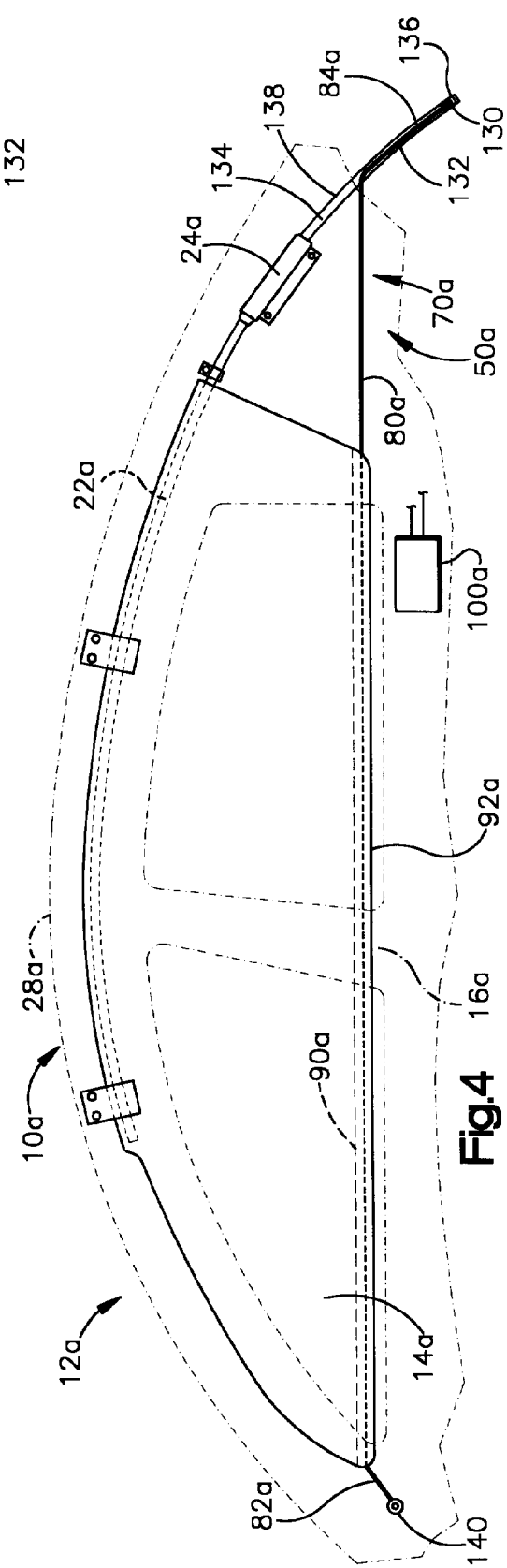

INFLATABLE CURTAIN WITH TENSIONING DEVICE

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. An inflatable curtain which is inflatable from the roof of the vehicle downward inside the passenger compartment between a vehicle occupant and the side structure of the vehicle in the event of a side impact or rollover is also known. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle which has a side structure. The apparatus includes a vehicle occupant protection device that is inflatable in a first direction into a position between the side structure of the vehicle and a vehicle occupant. When inflated, the vehicle occupant protection device extends fore and aft in the vehicle along the side structure of the vehicle. An inflator provides inflation fluid for inflating the vehicle occupant protection device.

A mechanism causes the vehicle occupant protection device, when inflated, to be tensioned in the first direction along the fore and aft extent of the vehicle occupant protection device. The mechanism helps maintain the vehicle occupant protection device in position between an occupant of the vehicle and the side structure of the vehicle throughout the duration of the vehicle collision and/or rollover.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view of a vehicle safety apparatus in a deflated condition in accordance with a first embodiment of the present invention;

FIG. 2 is a schematic view of the vehicle safety apparatus of FIG. 1 in an inflated condition;

FIG. 3 is a schematic view of a vehicle safety apparatus in a deflated condition in accordance with a second embodiment of the present invention; and FIG. 4 is a schematic view of the vehicle safety apparatus of FIG. 3 in an inflated condition.

DESCRIPTION OF PREFERRED EMBODIMENTS

As representative of the present invention, an apparatus 10 for helping to protect an occupant of a vehicle includes a vehicle occupant protection device. As shown in FIGS. 1 and 2, the vehicle occupant protection device comprises an inflatable curtain 14 mounted adjacent to the side structure 16 of the vehicle 12. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 which is disposed in a main chamber 34 of the inflatable curtain 14. The second end portion 32 of the fill tube 22 has a plurality of openings (not shown) that provide fluid communication between the fill tube 22 and the main chamber 34 of the inflatable curtain 14.

The inflator 24 preferably contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator which uses the combustion of gas-generating material to generate inflation fluid.

The vehicle occupant protection device 10 includes a housing 26 (FIG. 1) that stores the inflatable curtain 14 in a deflated condition. The fill tube 22, the deflated inflatable curtain 14, and housing 26 have an elongated configuration and extend along the vehicle roof 28 and along the side structure 16 of the vehicle 12 above the side windows 20.

The vehicle occupant protection device 10 (FIGS. 1 and 2) includes a mechanism 50 for tensioning the curtain 14 when the curtain is inflated. The mechanism 50 includes a pulley 60, a tensioning device 70, and a flexible elongated member 80.

The pulley 60 is fixed to the side structure 16 of the vehicle 12 at a location designated 61 near or on the A pillar of the vehicle 12. The tensioning device 70 is fixed to the side structure 16 of the vehicle 12 at a location designated 62 near or on the C pillar of the vehicle 12.

In the embodiment of FIGS. 1 and 2, the tensioning device 70 consists of a reel 72 connected to the side structure 16 of the vehicle 12 by a mounting bracket 74. The reel 72 is in the nature of a pretensioner and is associated with an ignitable charge which, when ignited, causes the reel to rotate in a given direction.

The flexible elongated member 80 comprises a cable, or the like, and has a first end 82 and an opposite second end 84. The first end 82 of the flexible elongated member 80 is fixedly connected to the side structure 16 of the vehicle 12 at a location 86. The flexible elongated member 80 extends from location 86 around the pulley 60 and through a sleeve 90 (FIG. 2) formed along a bottom edge 92 of the inflatable curtain 14 to the reel 72. The second end 84 of the flexible elongated member 80 is secured to the reel 72.

In the illustrated embodiment, the first end 82 of the flexible elongated member 80 is connected to the housing 26 which is connected to the side structure 16 of the vehicle 12. It should be understood, however, that the first end 82 of the flexible elongated member 80 could be connected directly to the side structure 16 of the vehicle 12 at the location 86. Also, it should be understood that the pulley 60 could be omitted from the mechanism 50, in which case the first end 82 of the flexible elongated member 80 would be fixedly connected to the side structure 16 of the vehicle 12 at the location 61.

In the deflated condition of FIG. 1, the flexible elongated member 80 is stored in the housing 26 and extends from location 86 in a path along the vehicle roof 28 and side structure 16 of the vehicle 12 above the side windows 20 to the tensioning device 70.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 and the tensioning device 70 in response to the sensing of a side impact or a vehicle rollover.

In the event of a rollover of the vehicle or a side impact to the vehicle 12 of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the fill tube 22. The fill tube 22 directs the fluid into the main chamber 34 of the inflatable curtain 14.

The inflatable curtain 14 (FIG. 2) inflates under the pressure of the inflation fluid from the inflator 24. The housing 26 opens and the inflatable curtain 14 inflates in a downward direction as shown in the drawings and in a downward direction with respect to the direction of forward travel of the vehicle 12. The curtain 14, when inflated, extends fore and aft in the vehicle 12 along the side structure 16 of the vehicle 12 and is positioned between the side structure 16 of the vehicle 12 and any occupant of the vehicle 12 and between the roof 28 of the vehicle 12 and the mechanism 50.

The sensor mechanism 100 actuates the tensioning device 70 simultaneously with the inflator 24. The ignitable charge is ignited, causing the reel 72 to rotate. The rotating reel 72 pulls upon and applies a tension to the flexible elongated member 80. As the inflatable curtain 14 inflates downward along the side structure 16 of the vehicle 12, the flexible elongated member 80 is wound around the reel 72.

In the inflated condition, the flexible elongated member 80, extending through the sleeve 90 along the bottom edge 92 of the curtain 14, tensions the curtain 14 in a downward direction as shown in the drawings and in a downward direction relative to the direction of forward travel of the vehicle 12. Thus, the tensioning device 70 tensions the curtain 14 in the same direction as the curtain 14 is inflated. The tensioning device 70 tensions the curtain 14 throughout the fore and aft extent of the inflated curtain 14 along the side structure 16 of the vehicle 12.

The position of the pulley 60 and the reel 72 of the tensioning device 70 relative to the inflated curtain 14 is such that the inflated curtain 14 is tensioned downward as shown in the drawings and downward with respect to the direction of forward travel of the vehicle 12. Specifically, the pulley 60 and reel 72 are located, as shown in the drawings, below the bottom edge 92 of the inflated curtain 14.

As the inflated curtain 14 deflates, downward tension on the curtain 14 is maintained by the tensioning device 70. When the curtain 14 is fully deflated, the flexible elongated member 80 still extends through the sleeve 90 and acts to hold the curtain 14 in position. Thus, the mechanism 50 helps maintain the position of the curtain 14 between any occupant of the vehicle 12 and the side structure 16 of the vehicle 12 throughout the duration of the vehicle collision and/or rollover.

A second embodiment of the present invention is illustrated in FIGS. 3 and 4. The second embodiment of the invention is similar to the first embodiment of the invention illustrated in FIGS. 1 and 2. Accordingly, numerals similar to those of FIGS. 1 and 2 will be utilized in FIGS. 3 and 4 to identify similar components, the suffix letter "a" being associated with the numerals of FIGS. 3 and 4 to avoid confusion.

The apparatus 10a of the second embodiment is identical to the apparatus 10 (FIGS. 1 and 2), except that the configuration of the mechanism 50a (FIGS. 3 and 4) differs from the configuration of the mechanism 50 (FIGS. 1 and 2). The mechanism 50a (FIGS. 3 and 4) includes a tensioning device 70a and a flexible elongated member 80a.

The tensioning device 70a is fixed to the side structure 16a of the vehicle 12a in a location designated 138 near or on the C pillar of the vehicle 12a. The tensioning device 70a consists of a piston 130 located within a cylinder 132. The piston 130 is actuatable to move from a first end portion 134 of the cylinder 132 to a second end portion 136 of the cylinder 132. The first end portion 134 of the cylinder 132 is connected in fluid communication with inflator 24a.

The first end 82a of the flexible elongated member 80a is fixedly connected to the side structure 16a of the vehicle 12a at a location 140 near or on the A pillar of the vehicle 12a. The flexible elongated member 80a extends through the sleeve 90a along the bottom edge 92a of the inflatable curtain 14a to the piston 130. The second end 84a of the flexible elongated member 80a is secured to the piston 130.

Upon sensing a side impact or rollover, the sensor mechanism 10a actuates the inflator 24a. The inflatable curtain 14a inflates under the pressure of the inflation fluid from the inflator 24a and becomes positioned between the side structure 16a of the vehicle 12a and any occupant of the vehicle 12a and between the roof 28a of the vehicle 12a and the mechanism 50a. The curtain 14a inflates in a downward direction as shown in the drawings and in a downward direction with respect to the direction of forward travel of the vehicle 12a. The curtain 14a, when inflated, extends fore and aft in the vehicle along the side structure 16a of the vehicle 12a.

When actuated, the inflator 24a directs pressurized fluid into the cylinder 132. As the fluid pressurizes the cylinder 132, the piston 130 is actuated and moves from the first end portion 134 of the cylinder 132 toward the second end portion 136 of the cylinder 132. The piston 130 pulls the flexible elongated member 80a as the piston 130 moves toward the second end portion 136 of the cylinder 132. The inflator 24a inflates the inflatable curtain 14a and actuates the piston 130 simultaneously.

In the inflated condition, the flexible elongated member 80a, extending through the sleeve 90a along the bottom edge 92a of the curtain 14a, tensions the curtain 14a in a downward direction as shown in the drawings and in a downward direction relative to the direction of forward travel of the vehicle 12a. Thus, the tensioning device 70a tensions the curtain 14a in the same direction as the curtain 14a is inflated. The tensioning device 70a tensions the curtain 14a throughout the fore and aft extent of the inflated curtain 14a along the side structure 16a of the vehicle 12a.

The position of the piston 130 and the cylinder 132 of the tensioning device 70a relative to the inflated curtain 14a is such that the inflated curtain 14a is tensioned downward as shown in the drawings and downward with respect to the direction of forward travel of the vehicle 12a. Specifically, the location 138 of the cylinder 132, as shown in the drawings, is such that the second end portion 136 of the cylinder 132 extends below the bottom edge 92a of the inflated curtain 14a.

As the inflated curtain 14a deflates, downward tension on the curtain 14a is maintained by the tensioning device 70a. When the curtain 14a is fully deflated, the flexible elongated member 80a still extends through the sleeve 90a and acts to hold the curtain 14a in position. Thus, the mechanism 50a helps maintain the position of the curtain 14a between any occupant of the vehicle 12a and the side structure 16a of the vehicle 12a throughout the duration of the vehicle collision and/or rollover.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle which has a side structure, said apparatus comprising:
   a vehicle occupant protection device which is inflatable in a first direction into a position between the side structure of the vehicle and a vehicle occupant, said vehicle occupant protection device when inflated extending fore and aft in the vehicle along the side structure of the vehicle;
   an inflator for providing inflation fluid for inflating said vehicle occupant protection device;
   a tensioning device; and
   a flexible elongated member having a first end connected to the vehicle at a first location and an opposite second end connected to said tensioning device, said flexible elongated member extending through said vehicle occupant protection device along a bottom edge of said vehicle occupant protection device,
   said tensioning device pulling on said flexible elongated member when said vehicle occupant protection device is inflated, said flexible elongated member tensioning said vehicle occupant protection device in said first direction along the fore and aft extent of said vehicle occupant protection device.

2. Apparatus as defined in claim 1, wherein said bottom edge of said vehicle occupant protection device is located between said tensioning device and the vehicle roof.

3. Apparatus as defined in claim 1, wherein said vehicle occupant protection device is an inflatable curtain having a store position extending along the side structure adjacent the roof of the vehicle, said inflatable curtain being inflated in said first direction away from the vehicle roof and along the side structure of the vehicle.

4. Apparatus as defined in claim 3, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

5. Apparatus as defined in claim 3, wherein said inflatable curtain has a main chamber into which inflation fluid is directed to inflate said inflatable curtain and has a sleeve portion forming said bottom edge of the inflatable curtain, said flexible elongated member extending through said sleeve portion.

6. Apparatus as defined in claim 3, further including a sensor for sensing a vehicle condition for which inflation of said side curtain is desired, said sensor actuating said inflator to provide inflation fluid to said fill tube and for actuating said tensioning device.

7. Apparatus as defined in claim 6, wherein said sensor actuates said inflator and simultaneously actuates said tensioning device.

8. Apparatus as defined in claim 1, wherein said first direction is downward with respect to the direction of forward travel of the vehicle.

9. Apparatus as defined in claim 1 wherein said tensioning device comprises an elongated cylinder having first and second opposite end portions and a piston movable within said cylinder, said first end portion of said cylinder being in fluid communication with said inflator which, when actuated, provides inflation fluid to said cylinder for moving said piston from said first end portion of said cylinder towards said second end portion of said cylinder.

10. Apparatus as defined in claim 9 wherein said second end of said flexible elongated member is connected to said piston, said piston pulling on said flexible elongated member when said piston moves from said first end portion of said cylinder towards said second end portion of said cylinder.

11. Apparatus for helping to protect an occupant of a vehicle which has a side structure, said apparatus comprising:
   a vehicle occupant protection device which is inflatable in a downward direction with respect to the direction of forward travel of the vehicle into a position between the side structure of the vehicle and a vehicle occupant, said vehicle occupant protection device when inflated extending fore and aft in the vehicle along the side structure of the vehicle;
   a mechanism for pulling on said vehicle occupant protection device in said downward direction along the entire fore and aft extent of a bottom edge of said vehicle occupant protection device and tensioning said bottom edge when said vehicle occupant protection device is inflated; and
   an inflator for providing inflation fluid for inflating said vehicle occupant protection device and providing fluid to actuate said mechanism.

12. Apparatus as defined in claim 11, wherein said vehicle occupant protection device is an inflatable curtain having a stored position extending along the side structure adjacent the roof of the vehicle, said inflatable curtain being inflated in said downward direction away from the vehicle roof and along the side structure of the vehicle.

13. Apparatus as defined in claim 12, further including a fill tube having a portion located in said inflatable curtain and an inflator in fluid communication with said fill tube, said inflator, when actuated, providing inflation fluid to said fill tube, said fill tube directing said inflation fluid into said inflatable curtain to inflate said inflatable curtain.

14. Apparatus as defined in claim 12, wherein said mechanim, comprises a flexible elongated member, said flexible elongated member having first and second opposite ends, said first end being fixed to the vehicle at a first location, said flexible elongated member extending from said first location through said inflatable curtain along the entire fore and aft extent of said bottom edge of said inflatable curtain, said second end of said flexible elongated member being associated with a tensioning device for, when actuated, pulling said flexible elongated member, said bottom edge of said inflatable curtain being located between said tensioning device and the vehicle roof, said flexible elongated member tensioning said inflatable curtain in said downward direction along the entire fore and aft extent of said bottom edge when pulled by said tensioning device.

15. Apparatus as defined in claim 14, wherein said inflatable curtain has a main chamber into which inflation fluid is directed to inflate said inflatable curtain and has a sleeve portion forming said bottom edge of the inflatable curtain, said flexible elongated member extending through said sleeve portion.

16. Apparatus as defined in claim 14 wherein said tensioning device comprises an elongated cylinder having first and second opposite end portions and a piston movable within said cylinder, said first end portion of said cylinder towards said second end portion of said cylinder.

17. Apparatus as defined in claim 16 wherein said second end of said flexible elongated member is connected to said piston, said piston pulling on said flexible elongated member when said piston moves from said first end portion of said cylinder towards said second end portion of said cylinder.

* * * * *

UNITED STATES PATENT AND TRADEMARK OFFICE
CERTIFICATE OF CORRECTION

PATENT NO. : 6,308,982 B1
DATED : October 30, 2001
INVENTOR(S) : John P. Wallner et al.

It is certified that error appears in the above-identified patent and that said Letters Patent is hereby corrected as shown below:

<u>Column 5,</u>
Line 34, delete "store" and insert -- stored --.

<u>Column 6,</u>
Line 59, after "cylinder" (second occurrence) insert -- being in fluid communication with said inflator which, when actuated, provides inflation fluid to said cylinder for moving said piston from said first end portion of said cylinder --.

Signed and Sealed this

Thirteenth Day of August, 2002

*Attest:*

*Attesting Officer*

JAMES E. ROGAN
*Director of the United States Patent and Trademark Office*